Jan. 5, 1937.                H. A. JAHRAUS                2,066,936
                    DEVICE FOR CEMENTING OPTICAL LENSES
                            Filed June 8, 1935

Inventor
HAROLD A. JAHRAUS,
By
Attorneys

Patented Jan. 5, 1937

2,066,936

UNITED STATES PATENT OFFICE 2,066,936

DEVICE FOR CEMENTING OPTICAL LENSES

Harold A. Jahraus, Richmond, Ind., assignor of one-half to Sidney S. Miller, Indianapolis, Ind.

Application June 8, 1935, Serial No. 25,693

6 Claims. (Cl. 18—17)

The manufacture of laminated safety glass involves the steps of disposing a sheet of cementing material between two sheets of glass and subjecting the assembly to pressure while it is heated and subsequently cooled to cement the two sheets of glass firmly together. The present invention relates to a device for carrying out this purpose on small glass articles, such as spectacle-lens blanks.

It is the object of my invention to produce a device of the type indicated which may be simply and economically manufactured and which will maintain a plurality of laminated lenses under pressure while they are successively heated and subsequently cooled. A further object of my invention is to produce a device from which a cemented blank may be readily removed and an uncemented blank inserted in its place while another blank is in association with a source of heat. Still another object of my invention is to produce a device of this kind in which the pressure to which the blanks are subjected may be regulated with a fair degree of accuracy without the necessity for any complicated or expensive indicating mechanism.

In carrying out my invention, I employ a movable carrier, preferably in the form of a rotatable turret, having provisions for the reception of a plurality of cups each of which contains a laminated lens blank. Each of the cups is of a diameter such as to loosely receive the blank and of a depth to permit the reception, in addition to the blank, of a supply of inert pressure-distributing material through which pressure is applied to opposite sides of the blanks. In association with each cup I provide a pressure-applying head consisting of a lower member adapted to enter the cup, an upper member adapted to be engaged by clamping means, and a compression spring interposed between the two members, the head including means guiding the two members for relative movement axially of the cups.

Figure 1:
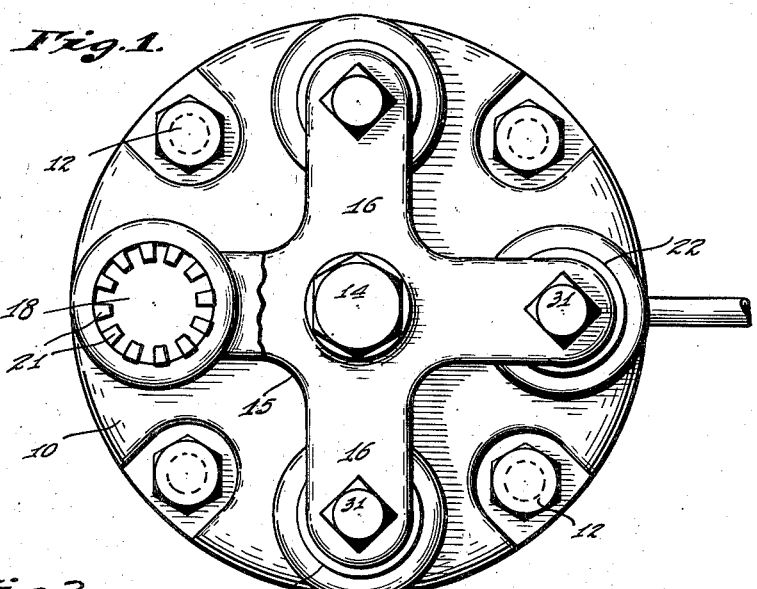
Figure 2:
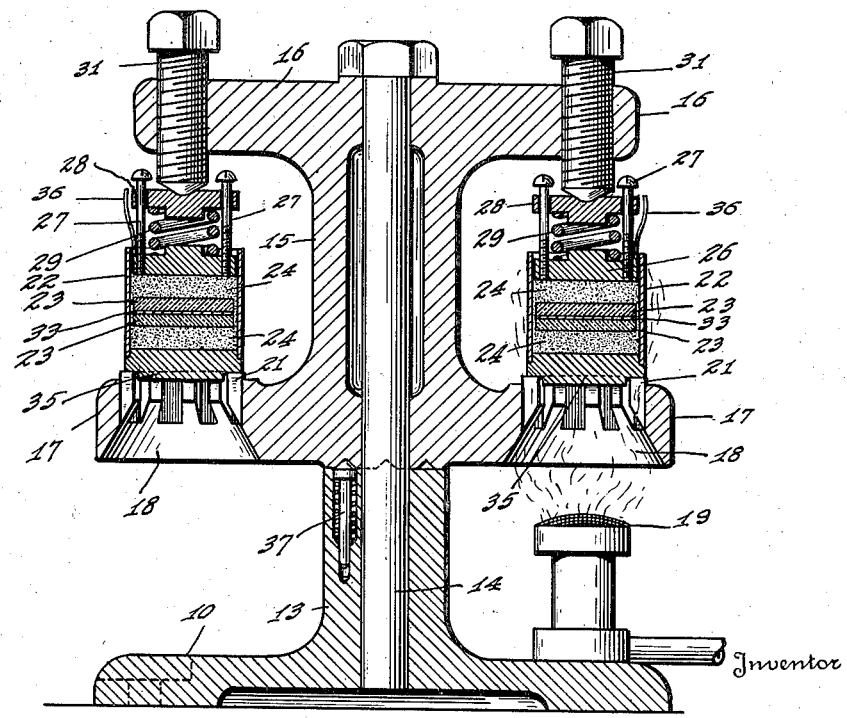

The accompanying drawing illustrates my invention: Fig. 1 is a top plan view of the device with a portion thereof broken away; and Fig. 2 is a vertical axial section through the device.

The device illustrated in the drawing comprises a base 10, preferably adapted to be secured to a table or other support as by means of screws 12. The base is provided with a centrally disposed upwardly extending boss 13 within which is mounted a vertical spindle 14. Upon the spindle 14 and above the boss 13 there is rotatably mounted a turret 15 provided at its top with an annular series of radiating arms 16 and at its bottom with a plurality of radiating arms 17, each arm 17 being disposed below one of the arms 16.

Each of the arms 17 has near its outer end a hole 18 extending through it and positioned radially so that it can be disposed above a burner 19 mounted on the base 10. Each of the holes 18 is provided with an annular series of vertically extending grooves defining inwardly projecting ribs 21 which preferably extend a slight distance above the upper surface of the arm 17 to provide support for a lens-receiving cup 22. The grooves between the ribs 21 are deep enough so that their upper ends are not completely closed by the bottom of the cup 22, thus permitting gases from the burner 19 to escape through the grooves and to pass upwardly along the sides of the cup. To aid in directing the gases from the burner 19, the holes 18 may flare outwardly and downwardly.

Each of the cups 22 has an internal diameter slightly larger than the external diameter of the glass discs 23 of which each blank is formed, so that the laminated blanks may be readily inserted and removed from the cups and maintained in proper axial alinement while therein. To insure the even distribution of pressure over the outer faces of the laminated blanks, layers 24 of some suitable packing material, preferably granular in nature, are disposed in the cup 22 both above and below the blanks. The layers of pressure-distributing material should be thin enough to prevent arch action thereof from interfering with the application of an evenly distributed pressure to the blank.

The upper layer of packing material 24 is disposed well below the top of the cup in order to leave room for the reception of the lower member 26 of a pressure-applying head, the member 26 being circular and of a diameter to be loosely received in the cup. The lower member 26 of the head carries guide posts, conveniently in the form of screws 27, which are received in suitable openings in the upper member 28 of the head and which serve to maintain the upper and lower members in proper alinement with each other. A coiled compression spring 29 is disposed between the members 26 and 28 and operates normally to hold the upper member 28 against the heads on the screws 27.

In each of the arms 16 and co-axial with the hole 18 in the arm 17 therebelow there is mounted a clamp screw 31. Conveniently, each of the screws 31 is a conically-pointed set-screw, the point of which is adapted to be received in a conical depression centrally located in the upper member 28 of the associated head.

In charging each of the cups 22, a layer of pressure-distributing material 24 is first put in place and the laminated lens blank consisting of the two discs 23 and an interposed sheet of cementing material 33 is dropped in place. The laminated blank is then covered with a second layer of packing material and the head is inserted in the cup. The cups, with their associated heads, are then put in place in the turret 15, each cup being disposed directly above one of the openings 18 and directly below the associated screw 31. Conveniently, each cup is provided on its bottom with a shallow centrally disposed circular boss 35 adapted to act as a pilot to center the cup in relation to the associated hole 18.

After each cup is put in place, the associated screw 31 is rotated to engage the member 28 and to force such member downwardly against the force exerted by the spring 29. The extent to which the spring 29 is compressed, as measured by movement of the upper member 28 along the screws 27, is dependent upon the characteristics of the spring and upon the pressure exerted by the associated screw 31; and, by suitably calibrating the springs, downward movement of the upper member 28 of each head may therefore be used as a measure of the pressure to which the laminated blank is subjected. If desired, one of the members of the head, here shown as the lower member, may be provided with an index or pointer 36 the position of which relative to the upper head will indicate the pressure on the lens blank. A convenient expedient is to so arrange the pointer 36 that it will be flush with the upper surface of the upper head member when the calibrated spring is compressed to the extent necessary to apply the desired pressure.

As the turret 15 is rotated intermittently, the cups 22 are successively brought above the burner 19, where they are left for a period sufficient to melt the cementing material 23. Desirably, the lower surface of the turret 15 above the boss 13 is provided with an annular series of depressions adapted to receive an upwardly spring-pressed detent 37 for the purpose of releasably holding the turret in position with one of the arms 17 above the burner 19. After each cup 22 has been above the burner 19 for a sufficient period of time, the turret 15 is rotated to bring the next cup above the burner; and, while that cup is being heated, a partially cooled cup containing a cemented blank is removed from the turret and replaced with a cup containing a blank to be cemented. This operation is performed at a point remote from the burner 19 and while another cup is being heated and thus does not result in any lost time.

Each spring 29 serves to maintain the blank in the associated cup under substantially constant pressure as it is heated and subsequently cooled, such changes as occur in the clamping mechanism as the result of temperature variations being insufficient to modify the compressed length of the spring to any material extent.

I claim as my invention:

1. A device of the type described, comprising a base, a turret rotatably supported from said base on a vertical axis, a heating element mounted on said base at a point displaced from the turret-axis, said turret being provided with an annular series of openings positioned to be brought successively over said heating element as the turret is rotated, removable cups adapted to be supported from said turret above the respective openings, each of said openings being provided with grooves permitting hot gases passing upwardly through said opening to escape and pass further upwardly along the sides of the associated cup, and means carried by said turret for applying pressure to material in each of said cups.

2. The invention set forth in claim 1 with the addition that the bottom of each cup is provided with a downwardly extending pilot adapted to enter the associated opening and center the cup thereabove.

3. A device of the type described, comprising a base, a carrier movably supported from said base, a heating element, said carrier being provided with means for supporting a series of cups positioned to be brought successively into association with said heating element as the carrier is moved, each of said cups being adapted to contain a supply of granular pressure-equalizing material, and means on said carrier for applying pressure to material in each of said cups.

4. In a device of the class described, a cup adapted to contain a supply of granular pressure-equalizing material, a support therefor, a pressure-transmitting head comprising upper and lower members and an interposed compression spring, said lower member being adapted to rest on material in said cup and being provided with means engaging the upper member and guiding it for movement axially of the cup, and means for applying pressure to said upper member.

5. In a device of the class described, a cup adapted to contain a supply of granular pressure-equalizing material, a cup-supporting member provided with an opening beneath said cup, and a cup-heating burner disposed beneath said opening, said opening being provided with grooves permitting the passage of gases from said burner upwardly through said supporting member and along the sides of said cup, the bottom of said cup having a pilot extending downwardly into said opening to center the cup thereabove.

6. In a device of the class described, a cup adapted to contain a supply of granular pressure-equalizing material, a cup-supporting member provided with an opening beneath said cup, and a cup-heating burner disposed beneath said opening, said opening being provided with grooves permitting the passage of gases from said burner upwardly through said supporting member and along the sides of said cup.

HAROLD A. JAHRAUS.